United States Patent [19]

Pauze

[11] 4,218,550
[45] Aug. 19, 1980

[54] COATING COMPOSITIONS

[75] Inventor: Denis R. Pauze, Scotia, N.Y.

[73] Assignee: General Electric Company, Schenectady, N.Y.

[21] Appl. No.: 923,729

[22] Filed: Jul. 11, 1978

Related U.S. Application Data

[63] Continuation of Ser. No. 538,079, Jan. 2, 1975, abandoned.

[51] Int. Cl.$^2$ ............................................. C08G 63/76
[52] U.S. Cl. ............................. 525/437; 260/29.2 TN; 260/29.2 N; 260/29.2 E; 525/440; 528/288; 528/289; 525/453
[58] Field of Search ................... 260/29.2 N, 29.2 NT, 260/29.2 E; 528/273, 289, 46; 428/424, 425

[56] References Cited

U.S. PATENT DOCUMENTS

| 3,102,868 | 2/1963 | Bolton et al. | 260/15.3 |
|---|---|---|---|
| 3,412,054 | 11/1968 | Milligan et al. | 260/18 |
| 3,528,937 | 9/1970 | Reynold et al. | 260/29.2 N |
| 3,639,418 | 2/1972 | Merten | 260/309.5 |
| 3,737,478 | 6/1973 | Boldebuck | 260/29.2 N |
| 3,759,873 | 9/1973 | Hudak | 260/75 NK |
| 3,779,991 | 12/1973 | Preston | 260/46.5 E |
| 3,856,754 | 12/1974 | Habermeier et al. | 528/289 |
| 3,897,377 | 7/1975 | Broecker et al. | 260/18 TN |
| 3,983,058 | 9/1976 | Hirooka et al. | 260/29.2 N |

Primary Examiner—J. Ziegler
Attorney, Agent, or Firm—Morgan, Finnegan, Pine, Foley & Lee

[57] ABSTRACT

The invention relates to polymeric coating compositions which are at least partially soluble in water and are particularly stable.

Polyester, polyesterimides, polyesteramides, polyesteramideimides, polyesterhydantoins and polyester urethanes are prepared with free carboxyl or carboxylic acid groups. The carboxylic acid groups are neutralized with amine containing material, at least fifty percent excess amine being used, producing a coating composition which is at least partially soluble in water. The coating compositions are particularly useful as electric insulating coatings or wire enamels which are readily coated on a metallic or other substrate and when cured form coatings having good electrical and physical properties. They are also useful in making laminates, composites, and the like.

6 Claims, No Drawings

COATING COMPOSITIONS

This is a continuation of application Ser. No. 538,079 filed Jan. 2, 1975 now abandoned.

This invention relates to polymeric coating compositions. More particularly, it relates to such coating compositions which are at least partially soluble in water and are stable in such solution over extended periods.

Resinous coating compositions in the form of varnishes and enamels in which for ease of application the polymer is dissolved in compatible solvents are well known. Such resinous compositions include polyesters, polyesterimides, polyesteramides, polyesteramideimides, polyesterhydantoins, and polyester urethanes, among others. Normally, the solvents used for such materials are organic and include such materials as cresols or cresylic acid, phenol, xylene, N-methylpyrrolidone, dimethylformamide, dimethyl sulfoxide, dimethylacetamide, and the like which, when driven off from the curing coating composition tend to pollute the atmosphere. Such solvents generally are also toxic, flammable, and some cause chemical burns. It would be advantageous from the point of view of complying with evermore strict pollution restrictions, as well as from the point of view of safety, to provide coating compositions of the above types which are at least partially or wholly soluble in water, and it is a primary object of the present invention to provide such coating materials, particularly such which are stable over long periods of time.

Briefly, there are provided according to the present invention polyester compositions or imide, amide, hydantoin and urethane variations thereof which are at least partially soluble in water and are characterized by improved stability.

The basic polyester compositions of the present invention are widely described in the literature and in U.S. Pat. Nos. such as 2,936,296; 3,249,578; 3,297,785; and 3,312,645, among others, the teachings of such patents being incorporated herein insofar as they are pertinent to the present teaching.

In the preparation of the present polyester compositions, dibasic, tribasic or tetrabasic or polybasic acid material and polyhydric alcohol having at least three hydroxyl groups and diol are combined in varying proportions. For example, the equivalent ratio of diol to polyhydric alcohol typically ranges from about 1 to 0.5 up to about 1 to 1.50, and preferably this ratio is 1 to 0.75. The equivalent proportion of the acid to the alcohol ranges from about 1 to 0.75 up to about 1 to 1.75, and preferably is 1 to 1.05.

In preparing the polyesterimide variations of the present invention, up to about 50 equivalent percent of the total acid constituent can be replaced by other carboxylic acid material containing imide groups such as those produced by the reaction of tricarboxylic acid material with polyamine in a 2 to 1 equivalent proportion.

Polyester hydantoin materials or polyesters containing hydantoin groups can be prepared by substituting for up to about 95 equivalent percent of the hydroxyl group containing material, hydantoin group containing material having two or more hydroxyl groups. Likewise, hydantoin group containing material having two or more acid or carboxylic groups can be substituted for up to about 95 equivalent percent of the dibasic acid material.

In preparing the polyesteramide or polyesteramideimide variations of the present invention, typically up to about 50 equivalent percent of the alcohol constituent can be replaced by polyamine to form amide and/or amideimide group containing materials.

In preparing polyester urethanes, up to about 40 equivalent percent of the acid can be replaced by polyisocyanate.

It will be realized that the above types of polyesters can be admixed or they can be combined in various proportions as desired by utilizing the desired proportions of the various modifying group containing materials.

The dibasic acids useful in the present connection include oxalic, maleic, succinic, glutaric, adipic, pimelic, suberic, azelaic, sebacic and dodecanedioic acids as well as unsaturated materials including maleic and fumaric materials, among others. Such acids can be expressed by the formula

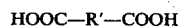

HOOC—R'—COOH where R' is a divalent saturated or unsaturated aliphatic group or one containing a carbon-to-carbon double bond and having from about one to forty carbon atoms, while the anhydrides can be expressed by

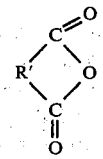

Also included are aromatic anhydrides or diacids or triacids or tetracids which are well known to those skilled in the art including, among others, isophthalic acid, terephthalic acid, mixtures thereof and their lower dialkyl esters, pyromellitic dianhydrides, benzophenonetetracarboxylic dianhydride and tetracarboxylicbutane dianhydride and trimesic acid as well as heterocyclic dibasic acids such as di(2-carboxyethyl)dimethylhydantoin. The unsaturated materials are also useful for end-capping or as terminal end groups as well as in the preparation of the intermediate material. The aliphatic and aromatic polybasic acid can be used above or in admixture in the preparation of the original mix of specific acid number and then used interchangeably or together to adjust this number where indicated. Alternatively, of course, all ingredients can be added in the original mix.

Among the polyhydric alcohols having three or more hydroxyl groups are glycerine, 1,1,1-trimethylolethane, sorbitol, mannitol, diglycerol, trimethylolpropane, pentaerythritol, tris(2-hydroxyethyl)isocyanurate, etc.

It will be realized also that in lieu of preparing the polyester variants by adding the modifying ingredients to the original reaction mixture, such variants can be prepared by first preparing the polyester itself and then introducing in well known manner imide or other desired group containing materials as is shown, for example, in the case of polyesterimides in U.S. Pat. No. 3,697,471.

Any of a number of diols can be used including ethylene glycol, neopentyl glycol, butane diol, pentane diol, and the like. Others will occur to those skilled in the art.

Among the tricarboxylic acid materials which are useful are trimellitic anhydride; 2,6,7-naphthalene tricarboxylic anhydride; 3,3',4-diphenyl tricarboxylic anhydride; 3,3',4-benzophenone tricarboxylic anhydride; 1,3,4-cyclopentane tetracarboxylic anhydride; 2,2',3-diphenyl tricarboxylic anhydride; diphenyl sulfone 3,3',4-tricarboxylic anhydride; diphenyl isopropylidene 3,3',4-tricarboxylic anhydride; 3,4,10-terylene tricarboxylic anhydride; 3,4-dicarboxyphenyl 3-carboxyphenyl ether anhydride; ethylene tricarboxylic anhydride; 1,2,5-naphthalene tricarboxylic anhydride; etc. The tricarboxylic acid materials can be characterized by the following formula:

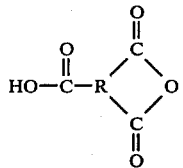

where R is a trivalent organic radical.

The polyamines useful in connection with the present invention may also be expressed by the formula

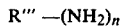

where R''' is a member selected from the class consisting of organic radicals of at least two carbon atoms (both halogenated and unhalogenated) including but not limited to, e.g., hydrocarbon radicals of up to 40 carbon atoms, and groups consisting of at least two aryl residues attached to each other through the medium of a member selected from the class consisting of an alkylene radical of from 1 to 10 carbon atoms, —S—, —SO$_2$—,

and —O—, etc., and n is at least 2.

Among the specific amines useful for the present invention, either alone or in admixture, are the following:

p-xylene diamine
bis(4-amino-cyclohexyl)methane
hexamethylene diamine
heptamethylene diamine
octamethylene diamine
nonamethylene diamine
decamethylene diamine
3-methyl-heptamethylene diamine
4,4'-dimethylheptamethylene diamine
2,11-diamino-dodecane
1,2-bis-(3-amino-propoxy)ethane
2,2-dimethyl propylene diamine
3-methoxy-hexamethylene diamine
2,5-dimethylhexamethylene diamine
2,5-dimethylheptamethylene diamine
5-methylnonamethylene diamine
1,4-diamino-cyclo-hexane
1,12-diamino-octadecane
2,5-diamino-1,3,4-oxadiazole
H$_2$N(CH$_2$)$_3$O(CH$_2$)$_2$O(CH$_2$)$_3$NH$_2$
H$_2$N(CH$_2$)$_3$S(CH$_2$)$_3$NH$_2$
H$_2$N(CH$_2$)$_3$N(CH$_3$)(CH$_2$)$_3$NH$_2$
meta-phenylene diamine
para-phenylene diamine
4,4'-diamino-diphenyl propane
4,4'-diamino-diphenyl methane benzidine
4,4'-diamino-diphenyl sulfide
4,4'-diamino-diphenyl sulfone
3,3'-diamino-diphenyl sulfone
4,4'-diamino-diphenyl ether
2,6-diamino-pyridine
bis(4-amino-phenyl)diethyl silane
bis(4-amino-phenyl)diphenyl silane
bis(4-amino-phenyl)phosphine oxide
4,4'-diaminobenzophenone
bis(4-amino-phenyl)-N-methylamine
bis(4-aminobutyl)tetramethyldisiloxane
1,5-diaminonaphthalene
3,3'-dimethyl-4,4'-diamino-biphenyl
3,3'-dimethoxy benzidine
2,4-bis(beta-amino-t-butyl)toluene
toluene diamine
bis(para-beta-amino-t-butyl-phenyl)ether
para-bis(2-methyl-4-amino-pentyl)benzene
para-bis(1,1-dimethyl-5-amino-pentyl)benzene
m-xylene diamine
polymethylene polyaniline Among the polyisocyanates useful in connection with the invention are those having two or more isocyanate groups, whether blocked or unblocked. Blocked isocyanates using as the blocking constituent phenols or alcohols, among others, can be used and in general provide a higher molecular weight final material which is advantageous in coating compositions. On the other hand, the unblocked isocyanates provide more flexible final materials. At any rate, the blocking material must be evaporated off as much as possible and there is no advantage from the purely reaction point of view to using the blocked material except as stated above. Typical of the blocked polyisocyanates is Mondur S wherein mixtures of 2,4- and 2,6-tolylene diisocyanate are reacted with trimethylol propane and blocked by esterification with phenol in the proportions of three moles of isocyanate, one mole of trimethylol propane, and three moles of phenol. In Mondur SH the isocyanate groups of mixed 2,4- and 2,6-tolylene diisocyanate are blocked by esterification with cresol. Among specific polyisocyanates which are useful alone or in admixture are the following:

tetramethylenediisocyanate
hexamethylenediisocyanate
1,4-phenylenediisocyanate
1,3-phenylenediisocyanate
1,4-cyclohexylenediisocyanate
2,4-tolylenediisocyanate
2,5-tolylenediisocyanate
2,6-tolylenediisocyanate
3,5-tolylenediisocyanate
4-chloro-1,3-phenylenediisocyanate
1-methoxy-2,4-phenylenediisocyanate
1-methyl-3,5-diethyl-2,6-phenylenediisocyanate
1,3,5-triethyl-2,4-phenylenediisocyanate
1-methyl-3,5-diethyl-2,4-phenylenediisocyanate
1-methyl-3,5-diethyl-6-chloro-2,4-phenylenediisocyanate
6-methyl-2,4-diethyl-5-nitro-1,3-phenylenediisocyanate
p-xylylenediisocyanate
m-xylylenediisocyanate
4,6-dimethyl-1,3-xylylenediisocyanate 1,3-dimethyl-4,6-bis-(b-isocyanatoethyl)-benzene
3-(a-isocyanatoethyl)-phenylisocyanate
1-methyl-2,4-cyclohexylenediisocyanate
4,4'-biphenylenediisocyanate
3,3'-dimethyl-4,4'-biphenylenediisocyanate
3,3'-dimethoxy-4,4'-biphenylenediisocyanate
3,3'-diethoxy-4,4-biphenylenediisocyanate
1,1-bis-(4-isocyanatophenyl)cyclohexane
4,4'-diisocyanato-diphenylether
4,4'-diisocyanato-dicyclohexylmethane
4,4'-diisocyanato-diphenylmethane
4,4'-diisocyanato-3,3'-dimethyldiphenylmethane
4,4'-diisocyanato-3,3'-dichlorodiphenylmethane
4,4'-diisocyanato-diphenyldimethylmethane
1,5-naphthylenediisocyanate
1,4-naphthylenediisocyanate
4,4',4'''-triisocyanato-triphenylmethane
2,4,4'-triisocyanato-diphenylether
2,4,6-triisocyanato-1-methyl-3,5-diethylbenzene
o-tolidine-4,4'-diisocyanate
m-tolidine-4,4'-diisocyanate
benzophenone-4,4'-diisocyanate
biuret triisocyanates
polymethylenepolyphenylene isocyanate The organic solvents where such are used in the present invention are well known to those skilled in the art and include N-methylpyrrolidone, dimethylformamide, dimethyl sulfoxide, dimethylacetamide, and isopropanol. Where such solvents are used in conjunction with water in the present invention, they are utilized to facilitate the runnability of the final coating composition, that is, to avoid such defects in the finished coatings as blisters and streaking or alternate light and dark spots. While the above solvents can be used alone, it has been found in some cases advantageous in solubilizing the composition in water to add up to about 10 percent by weight of other solvent such as alcohols such as butanol, ethylene glycol, propylene glycol, etc., cellosolves or carbitols, including but not limited to butyl cellosolve, ethyl cellosolve or other ester materials such as butyl acetate, ethyl acetate, and the like. Alcohols such as butanol, ethanol, propanol, etc. can also be used.

Generally, in preparing the present materials the alcoholic ingredients and acid or substituted acidic ingredients are mixed together and heated at a temperature of about 220° C. to an acid number ranging from about 10 to 70 and preferably about 35. Generally, at this point the alcohol such as butanol or butyl cellosolve or other equivalent material is added where such solution promotors are indicated. There is then added to the solution an amine group containing material which in reacting with or neutralizing the free carboxyl groups forms salts, making the composition at least partially or wholly soluble in water. According to the present invention, at least about fifty percent excess amine over the necessary to neutralize all free or unreacted carboxyl groups is added. Among the amine group containing materials useful in this respect are primary and secondary amines. Preferred are tertiary amines which are well known to those skilled in the art and include, among others, dimethylethanolamine, triethanolamine, phenylmethylethanolamine, butyldiethanolamine, phenyldiethanolamine, phenylethylethanolamine, methyldiethanolamine, and triethylamine. Also useful is ammonia or ammonium hydroxide.

After the amine group containing material has been added and reacted, the remainder of any water or water and solvent desired to obtain the required solids content is added.

The compositions of the present invention have been found to have improved properties and particularly so with respect to viscosity stability. Viscosity stability of greater than six weeks is common.

The following examples illustrate the practice of the present invention, it being understood that they are not to be taken as limiting in any way. All parts unless otherwise specified are by weight.

EXAMPLE 1

A reaction vessel equipped with stirrer, condenser, Dean Stark trap and thermometer was charged with 1420 parts trimethylol propane, 2660 parts neopentyl glycol, 1580 parts methylene dianiline, 2250 parts N-methylpyrrolidone, 3060 parts trimellitic anhydride, 3050 parts isophthalic acid, and 200 parts of tetraisopropyl titanate (TPT), the ingredients being heated to a maximum temperature of 220° C. to an acid number of about 10.8. The contents were then cooled to 170° C. and 1050 parts adipic acid added, the temperature being brought to 220° C. and held until an acid number of about 27.3 was obtained. The solution was then cooled and 2500 parts of butanol slowly added. To the still hot solution there were added 684 parts dimethylethanolamine in 700 parts of water. This represented 100 percent excess amine over that necessary to neutralize all free carboxyl groups. The contents were thoroughly mixed and 18,000 parts of water added. A dispersion at about 34.2 percent by weight solids was formed and a viscosity of less than A was obtained by the Gardner-Holt method. To the unclear solution there was added further dimethylethanolamine so that the above amount was doubled. A clear solution resulted in polyesterimide. This solution with a viscosity of 1600 centistokes at 25° C. remained stable and had experienced only a very slight change in viscosity after six weeks.

EXAMPLE 2

A polyesterimide was prepared by adding to a reaction vessel as in Example 1, 250 parts N-methylpyrrolidone, 142 parts trimethylol propane, 222 parts neopentyl glycol, 214 parts trimellitic anhydride, 111 parts methylene dianiline, 308 parts isophthalic acid, 20 parts tetraisopropyl titanate and 105 parts adipic acid, the contents being heated to a maximum temperature of 225° C. to an acid number of about 47.6. Then 48 parts of methylene dianiline and 92 parts of trimellitic anhydride were added at 175° C. The contents were then heated and held to 220° C. until an acid number of about 39.5 was reached. The contents were then cooled to 200° C. and 250 parts of propylene glycol added. There were then added at 150° C., 82 parts of dimethylethanolamine in 200 parts of water, the amount of amine added being about 120 percent of that required for neutralization of the free carboxyl groups.

The above example was repeated using 240 percent of the amount of dimethylethanolamine necessary for neutralization of all free carboxyl groups. This solution remained clear after over eight weeks while the other example containing 120 percent theoretical amine for neutralization of all free carboxyl groups had become hazy and unclear.

When the first sample containing 120 percent of the theoretical necessary amine was applied to 18 AWG copper wire at a speed of 50 ft/min. to a build of 2.9 to 3.1 mils and cured at 300° C. to 470° C., the flexibility at 25 percent storage was 1X, the dissipation factor at 170° C. was 8.1, the cut-through was 238°, the 150° C. heat shock with zero percent stretch was 1X, the dielectric strength was 9.4 KV and the burn-out OFM was 10.2. When the material containing the larger amount of amine was applied to 18 AWG wire at a speed of 55 ft/min. to a build of about 2.9 to 3 mils and cured at 300° C. to 470° C., the flexibility at 25 percent stretch was 1X, the dissipation factor at 170° C. was 11.4, the cut-through was 243° C., the 150° C. heat shock with zero percent stretch was 1X and the dielectric strength was 7.4, and the burn-out OFM was 8.3.

EXAMPLE 3

A kettle as in Example 1 was charged with 1420 parts trimethylol propane, 2660 parts neopentyl glycol, 1580 parts methylene dianiline, 2250 parts N-methylpyrrolidone, 3060 parts trimellitic anhydride, 3050 parts isophthalic anhydride, and 200 parts of tetraisopropyl titanate (TPT), the mixture being heated to a temperature of 220° C. to an acid number of 9.5. The contents were then cooled to 170° C. and 1050 parts adipic acid added. The temperature was then brought to 220° C. and maintained at an acid number of about 30. The solution was then cooled to about 150° C. to 170° C. and 2500 parts of butanol slowly added. To the still hot solution there were added 1574 parts of dimethylethanolamine in 1600 parts of water. The solution was stirred and 18,000 parts of water added. The viscosity of the polyesterimide material at 30° C. was 2674 centipoises and the solids were 30.1. This material maintained its viscosity over a period of three months.

EXAMPLE 4

This example is of a polyester material where five equivalent percent of the acid groups present have been substituted with imide containing moieties.

A vessel as in Example 1 was charged with 142 parts trimethylol propane, 222 parts neopentyl glycol, 39.5 parts methyl dianiline, 125 parts N-methylpyrrolidone, 76.5 parts trimellitic anhydride, 503 parts isophthalic acid and 20 parts tetraisopropyl titanate, the contents being heated at 225° C. to an acid number of 31.5. Then 105 parts of adipic acid were added and the reaction continued at the above temperature to an acid number of 65.2. The solution was cooled to 150° C. and 250 parts of butanol slowly added. The addition of dimethylethanolamine to neutralize 100 percent of the carboxylic acid groups did not give a clear solution. However, when two times the amount necessary was added, or 268 parts in 300 parts of water, a clear and stable solution was obtained after the addition of 1800 parts of water. The final solids content of this polyesterimide material was 28.0 percent with a Gardner-Holt viscosity at 25° C. of Z-3. When this material was coated on 18 AWG copper wire at a speed of 45 ft/min. to a build of about 2.9 mils and cured at 300° C. to 475° C., the flexibility at 25 percent stretch was 1X, the 150° C. heat shock with zero percent was 2X, the cut-through was 229° C., the dielectric strength was 9.5 KV, and the burn-out OFM was 5.5.

EXAMPLE 5

There were charged to a vessel equipped as in Example 1, 122.5 parts trimethylol propane, 213 parts neopentyl glycol, 158 parts methylene dianiline, 257 parts trimellitic anhydride, 225 parts N-methylpyrrolidone, 335 parts of acid containing 85 percent isophthalic acid and 15 percent terephthalic acid along with 20 parts of tetraisopropyl titanate (TPT). The contents were heated to a temperature of 220° C. with removal of water to an acid number of 18.7. There were then added 250 parts of butanol. Then 49 parts of dimethylethanolamine and 200 parts of water were added and to this an additional 1400 parts of water added. All resulting enamel was haxy and another 49 parts of dimethylethanolamine were added, the total amount of amine being 100 percent in excess of that necessary for neutralization, a clear solution resulting. The viscosity at 25° C. of the polyesteramideimide was 2200 centistokes and the solids was 29.5. When this material was applied to 18 AWG copper wire at a speed of 50 ft/min. to a build of about 3.0 to 3.2 mils and cured at a temperature of 300° C. to 475° C., the flexibility at 25 percent stretch was 1X, the 170° C. dissipation factor was 6.7, the cut-through was 240° C., the 150° C. heat shock with zero percent stretch was 1X as it is at 20 percent stretch, the dielectric was 13.0 KV and the burn-out OFM was 8.1. This material remained stable particularly with respect to viscosity for over four months.

There are provided by the present invention polyester resin coating solutions, and such coating solutions in which the polyester is variously modified with imide, amide, urethane and hydantoin groups and combinations thereof which are characterized by good coating characteristics and particularly by their ability to be dissolved at least partly or wholly in water, thus representing a decided improvement over normal organic solvent solutions of such materials. The materials of the present invention are also useful in preparing laminates of layered material and composites of particles, fibers and the like. They are characterized by generally salutary properties and are particularly characterized by their viscosity stability over long periods of time.

What I claim as new and desire to secure by Letters Patent of the United States is:

1. A polyester hydantoin containing coating compositions having free carboxyl groups wherein all of the free carboxyl groups are neutralized with a compound selected from the group consisting of an amine, ammonia and ammonium hydroxide, said compound being used in at least fifty percent excess of that necessary to neutralize said free carboxyl groups.

2. A composition as in claim 1 wherein the polyester moiety of said polyester hydantoin is the reaction product of acid material, polyhydric alcohol having at least three hydroxyl groups and diol.

3. A composition as in claim 2 wherein up to about 95 equivalent percent of the hydroxyl group containing material is material having hydantoin groups with two or more hydroxyl groups.

4. A composition as in claim 2 wherein up to about 95 equivalent percent of the acid reactant is material having hydantoin groups with two or more carboxylic acid groups.

5. A composition as in claim 2 wherein up to about 95 equivalent percent of the hydroxyl containing material is material having hydantoin groups with at least two carboxylic acid groups and at least two hydroxyl groups.

6. The process of preparing a water-soluble polyester hydantoin containing coating composition which comprises reacting polybasic acid material, polyhydric alcohol having at least three hydroxyl groups, diol and a hydantoin group containing material to form a polyester hydantoin having free carboxyl groups and further reacting said polyester hydantoin with a compound selected from the group consisting of an amine, ammonia and ammonium hydroxide to neutralize all of said free carboxyl groups, the amount of said compound being at least about fifty percent in excess of that necessary to neutralize said free carboxyl groups.

* * * * *